United States Patent [19]

Helfrick

[11] Patent Number: 4,730,230

[45] Date of Patent: Mar. 8, 1988

[54] APPARATUS AND METHOD FOR DEGAUSSING MAGNETIC STORAGE MEDIA

[75] Inventor: Albert Helfrick, Boonton, N.J.

[73] Assignee: Dowty RFL Industries, Inc., Boonton, N.J.

[21] Appl. No.: 32,782

[22] Filed: Mar. 31, 1987

[51] Int. Cl.$^4$ .......................... H01F 7/20; H01F 13/00
[52] U.S. Cl. ...................................... 361/151; 335/284
[58] Field of Search ................. 361/149, 151; 335/284

[56] References Cited

U.S. PATENT DOCUMENTS

| | | | |
|---|---|---|---|
| 245,275 | 8/1881 | Caldwell et al. | 361/149 |
| 733,637 | 7/1903 | Forster | 361/149 |
| 2,240,749 | 11/1939 | Beechlyn | 175/181 |
| 2,786,970 | 7/1953 | Connoy | 317/123 |
| 3,023,280 | 2/1962 | Tronslin et al. | 361/151 |
| 3,143,689 | 8/1962 | Hall | 317/157.5 |
| 3,303,398 | 2/1967 | Barta et al. | 317/157.5 |
| 3,321,586 | 5/1967 | Krones | 179/100.2 |
| 3,588,623 | 6/1971 | Camras | 317/157.5 |
| 3,609,465 | 9/1971 | Gruetzmacher et al. | 317/157.5 |
| 3,619,729 | 11/1971 | Littwin | 317/157.5 |
| 3,647,990 | 3/1972 | Eul et al. | 179/100.2 Z |
| 3,651,382 | 3/1972 | Trammell | 317/157.5 |
| 3,655,924 | 4/1972 | Puskas | 179/100.2 D |
| 3,657,638 | 4/1972 | Holler et al. | 324/37 |
| 3,723,668 | 3/1973 | Ritchey, Jr. | 179/100.2 D |
| 3,810,230 | 5/1974 | Orlowski et al. | 360/128 |
| 3,938,011 | 2/1976 | Littwin | 361/151 |
| 3,958,273 | 5/1976 | Alexandrovich et al. | 360/128 |
| 4,135,219 | 1/1979 | Yoshizawa et al. | 360/128 |
| 4,157,581 | 6/1979 | Keiichi et al. | 361/267 |
| 4,306,269 | 12/1981 | Bacchiere et al. | 361/149 |
| 4,346,426 | 8/1982 | Baumann et al. | 361/151 |
| 4,359,765 | 11/1982 | Mimura et al. | 361/147 |
| 4,360,854 | 11/1982 | Schergen et al. | 361/149 |
| 4,384,313 | 5/1983 | Steingroever et al. | 361/149 |
| 4,402,032 | 8/1983 | Wilterdink | 361/145 |
| 4,458,178 | 7/1984 | Tenney et al. | 315/8 |
| 4,462,055 | 7/1984 | Jackson et al. | 361/151 |
| 4,466,027 | 8/1984 | Howell et al. | 360/66 |
| 4,467,389 | 8/1984 | Knipp | 361/151 |
| 4,551,782 | 11/1985 | Seely et al. | 361/151 |

FOREIGN PATENT DOCUMENTS

| | | | |
|---|---|---|---|
| 159191 | 4/1931 | Australia | 361/149 |
| 1441742 | 5/1940 | France . | |
| 2047005 | 7/1956 | United Kingdom . | |

OTHER PUBLICATIONS

E. Pfau "Tonabndtechnik", 1973, Fischer Taschenbuchverlag Frankfurt a. Main, pp. 158, 159.
C. Koristka "Grundlagen der Magnetischen Signalspeicherung", vol. 1: Grundlagen und Magnetkopfe, 1968, pp. 153, 154.
M. Dickreiter "Handbuch der Tonstudiotechnik", 4th Edition, 1982, Saur, Munchen, pp. 250, 251.
Garner Tape Eraser Literature (7 sheets).

*Primary Examiner*—L. T. Hix
*Assistant Examiner*—David Porterfield
*Attorney, Agent, or Firm*—Martin M. Novack

[57] ABSTRACT

An apparatus and method for degaussing a magnetic storage medium, such as a reel of magnetic tape, is disclosed. A pair of opposing E-laminations have windings on their respective center legs. A reel of magnetic tape is inserted in the region between the E-laminations, and is rotated. An AC potential is coupled in series across the windings, to obtain a first magnetic field orientation in the region between the E-laminations. The direction of connection of one of the windings of the series arrangement is then reversed, to electrically alter the magnetic field orientation. This provides an effective degaussing of the magnetic tape.

20 Claims, 9 Drawing Figures

APPARATUS AND METHOD FOR DEGAUSSING MAGNETIC STORAGE MEDIA

BACKGROUND OF THE INVENTION

This invention relates to improvements in techniques and apparatus for erasing information stored on magnetic storage media.

There are many applications in which it is necessary to erase information on a magnetic storage medium, such as a magnetic tape, or the like. It is known, for example, that magnetic tape or tracks on a magnetic disc can be erased or "degaussed" by applying magnetic fields of opposite polarity across the tape or across magnetic disc tracks. In some applications, such as where the information to be erased is unclassified data, voice, music, etc., the thoroughness of the erasing technique may not be particularly important. On the other hand, for applications wherein the information to be erased is classified data, it is very important that the data be completely erased. However, there has generally been a problem in the prior art in attaining reliable and complete erasure of information from magnetic storage media, particularly for high coercivity or so-called high energy media. The thoroughness of erasure, including removal of noise, is also important in applications where information having a high signal-to-noise ratio, for example a high quality video signal, is to be subsequently recorded on the magnetic storage medium.

The configuration of the particular magnetic storage medium to be erased is an important factor in determining whether or not a given technique may be suitable for achieving sufficient erasing of information. For example, in some prior art systems it is necessary to have erasing heads or coils in close proximity to strips or tracks of magnetic media which may not be readily accessible, due to such factors as the sealing of the magnetic medium in an enclosure or the shape or packaging configuration of the magnetic medium as compared to the design of a particular erasing apparatus.

A further factor that is significant is the time and effort needed to implement the erasing of magnetic media. Prior art techniques which erase a strip or track of tape at a time are usually slow, and may require periodic operator intervention or monitoring. Even some techniques that erase bulk tape tend to be unduly complicated, which increases the time and effort needed for the erasing process, and increases the probability of human error or equipment failure.

In U.S. Pat. No. 4,551,782, assigned to the same assignee as the present application, there is disclosed a technique for degaussing a reel of magnetic tape wherein the reel is simultaneously rotated on its axis and subjected to a transverse magnetic field substantially in the plane of the reel. The transverse magnetic field is applied first in one direction and then in the opposite direction. An axial magnetic field, substantially parallel to the axis of the reel, is then applied, first in one direction and then in the opposite direction. In the embodiment set forth, the axial field is applied using a large ring-shaped coil that surrounds the periphery of the reel. The magnetic fields are applied with successively decreasing amplitudes.

In the U.S. Pat. No. 3,023,280, two opposing degaussing heads each contain a pair of coils. Each degaussing head has has an E-lamination of magnetic material, and the coils of each head are wound in series and are on the outer legs of the E-laminations. The coils are energized with AC current. The opposing coils at one end of the degaussing heads are wound to produce magnetic fields that are aiding (to obtain a vertical magnetic field), and opposing coils at the other end of the degaussing heads are wound to produce magnetic fields that are bucking (to obtain a horizontal magnetic field). A rotating reel of tape is passed between the degaussing heads. The tape is exposed to decreasing magnetic fields as it is passed through the fringe fields, this being done by shunting the fields with a sheet of iron. In addition to requiring four coils, the power in this system is shared by the two pairs of coils, and this limits the magnetic field strengths, particularly for the important field in the horizontal direction, which already tends to have a smaller field amplitude than the vertical field. Further, with the different field orientations occurring at once, the fields are not well defined in the desired vertical and horizontal directions, and it is necessary to ensure that all of the tape passes through both fields.

U.S. Pat. No. 3,938,011 discloses a tape degausser in which AC or DC is applied to upper and lower demagnetizing coils. The magnetism of the demagnetizing units is repeatedly reversed in polarity, with diminishing magnitude, to achieve degaussing.

In the U.S. Pat. No. 4,384,313 there is disclosed a process for demagnetization which uses alternating magnetic fields and capacitance to obtain resonance.

Reference can also be made to the following U.S. Pat. Nos.: 245,275, 733,637, 2,240,749, 2,786,970, 3,143,689, 3,303,398, 3,321,586, 3,588,623, 3,609,465, 3,619,729, 3,647,990, 3,651,382, 3,655,924, 3,657,638, 3,723,668, 3,810,230, 3,938,011, 3,958,273, 4,135,219, 4,157,581, 4,306,269, 4,346,426, 4,359,765, 4,360,854, 4,384,313, 4,458,178, 4,402,032, and 4,466,027.

Prior art techniques, such as those described in the patents noted above, have employed certain features to advantage in the degaussing of bulk magnetic tape reels, including: use of magnetic fields of different orientations; gradual reduction of the fields; and rotation of the tape during field application. Also, resonant circuits have been used to increase the power delivered to degaussing coils. However, the complexity and cost of equipment needed to implement these features has been problematic. The convenience and reliability of the degaussing procedure is another factor which comes into play. For example, equipment that requires undue handling of the magnetic tape reel (or undue movement by degaussing heads) during the degaussing proceedure, either manual or by mechanical means, has inherent disadvantage. Finally, the completeness of degaussing has still not met the most stringent requirements for certain applications.

It is among the objects of the present invention to provide a degaussing method and apparatus wherein controlled magnetic field components of sufficient strength can be applied to a reel of magnetic tape at specified orientations, without the need for large input power, complex or expensive coil arrays, or complex mechanical means for moving the magnetic tape or the coils.

SUMMARY OF THE INVENTION

The present invention is directed to an apparatus and method for degaussing magnetic storage media, and is particularly useful for degaussing reels of magnetic tape. As used herein, references to a reel of magnetic tape are intended to include, inter alia, cartridges or other receptacles which contain a reel of tape.

In accordance with an embodiment of the method of the invention, a magnetic storage medium is disposed in the region between a pair of substantially parallel windings. The windings are energized a first time to obtain either one state wherein the magnetic fields through the centers of the windings are in the same direction or another state wherein the magnetic fields through the centers of the windings are in opposing direction. The windings are then energized a second time to obtain the state not used during the first energizing time. As will be described, this results in two perpendicular magnetic field orientations that are particularly effective in degaussing the magnetic storage medium. The magnetic storage medium is rotated during the first and second energizing of the windings. The windings are energized by an alternating current, and the energizing steps include the gradual decreasing of the strength of the magnetic fields produced by the windings.

In the preferred embodiment, during the energizing of the windings a first time an AC energizing signal is applied across the windings in series, and during the energizing of the windings a second time the energizing signal is again applied across the windings in series, but with the direction of connection of one of the windings being reversed. Also, in the preferred embodiment, a capacitor is coupled across the windings, and the capacitance in the resonating circuit is modified during the energizing of the windings a second time to maintain a resonance condition.

In accordance with an embodiment of the apparatus of the invention, a pair of spaced apart magnetic field generating means are provided. Preferably, these comprise opposing E-laminations having windings around the central legs thereof. Means are provided for inserting a reel of magnetic tape into the region between the field generating means, and for rotating the magnetic tape. Means are provided for energizing both of the field generating means to produce a magnetic field substantially along one direction through the magnetic storage medium and for subsequently energizing both of the field generating means to electrically shift the direction of the produced magnetic field to be substantially along another direction through the magnetic storage medium, said another direction being perpendicular to said one direction.

Among the advantanges of the invention are the simplicity of the magnetic field generating means, the electronic switching of field orientation, the well defined and uniform fields in the degaussing region, the strength of the obtained fields, the ease of use of the system, and the complete erasure that is achieved. The invention has been demonstrated to be particularly successful in achieving effective erasure of high coercivity or so-called high energy magnetic tape.

Further features and advantages of the invention will become more readily apparent from the following detailed description when taken in conjunction with the accompanying drawings.

BRIEF DESCRIPTION OF THE DRAWINGS

FIG. 7, which includes graphs 7A, 7B, and 7C, illustrates waveforms in the triac control circuitry.

FIG. 8, which includes FIGS. 8A and 8B placed one below another, is a flow diagram of the routine for the processor of the FIG. 1 embodiment.

DESCRIPTION OF PREFERRED EMBODIMENT

Figure 1:
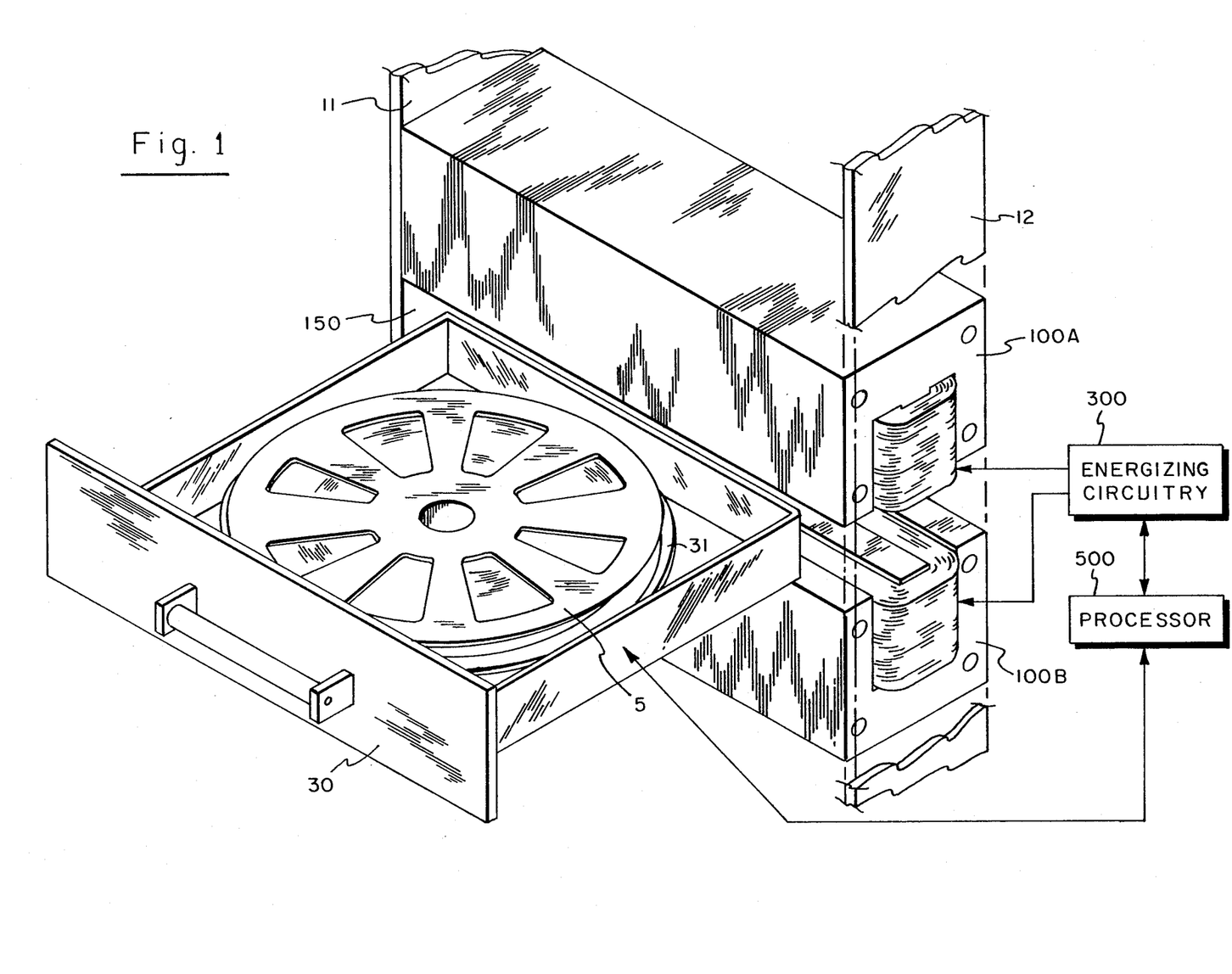
FIG. 1 is a diagram, partially in block form and partially in cut away form, of an apparatus in accordance with an embodiment of the invention, and which can be used to practice the method of the invention.

Referring to FIG. 1, there is shown a partially cutaway view of an apparatus in accordance with an embodiment of the invention, and which can be used to practice the method of the invention. A pair of magnetic field generating assemblies 100A and 100B are spaced apart, and mounted on supporting side walls 11 and 12, which may be a part of a frame or housing (not shown). A drawer 30 is adapted to slide into and out of the region 150 between the magnetic field generating assemblies. The drawer contains a rotating turntable 31 on which a reel 5 of magnetic tape, a magnetic tape cartridge, or other magnetic storage media, can be mounted. A motor (not shown) is mounted in the drawer 30 beneath the turntable 31. The invention is not directed, per se, to use of any particular type of drawer or turntable, and reference can be made, for example, to the U.S. Pat. No. 4,551,782, assigned to the same assignee as the present application, or to other patents listed above, for examples of implementations of a sliding drawer with associated turntable for holding and rotating magnetic storage media.

The magnetic field generating assemblies 100A and 100B are energized by energizing circuitry 300, to be described, which is under control of a processor 500. The processor 500 may be, for example, any suitable general purpose or special purpose computer or microprocessor, together with conventional memory, peripheral equipment, etc. In an operating implementation of the invention, a Model Z-80 processor, made by Zilog Corp. was utilized. The processor 500 also controls rotation of the motor that drives the turntable 31, and a sensor on the turntable provides information to the processor concerning rotation of the turntable.

Figure 2:
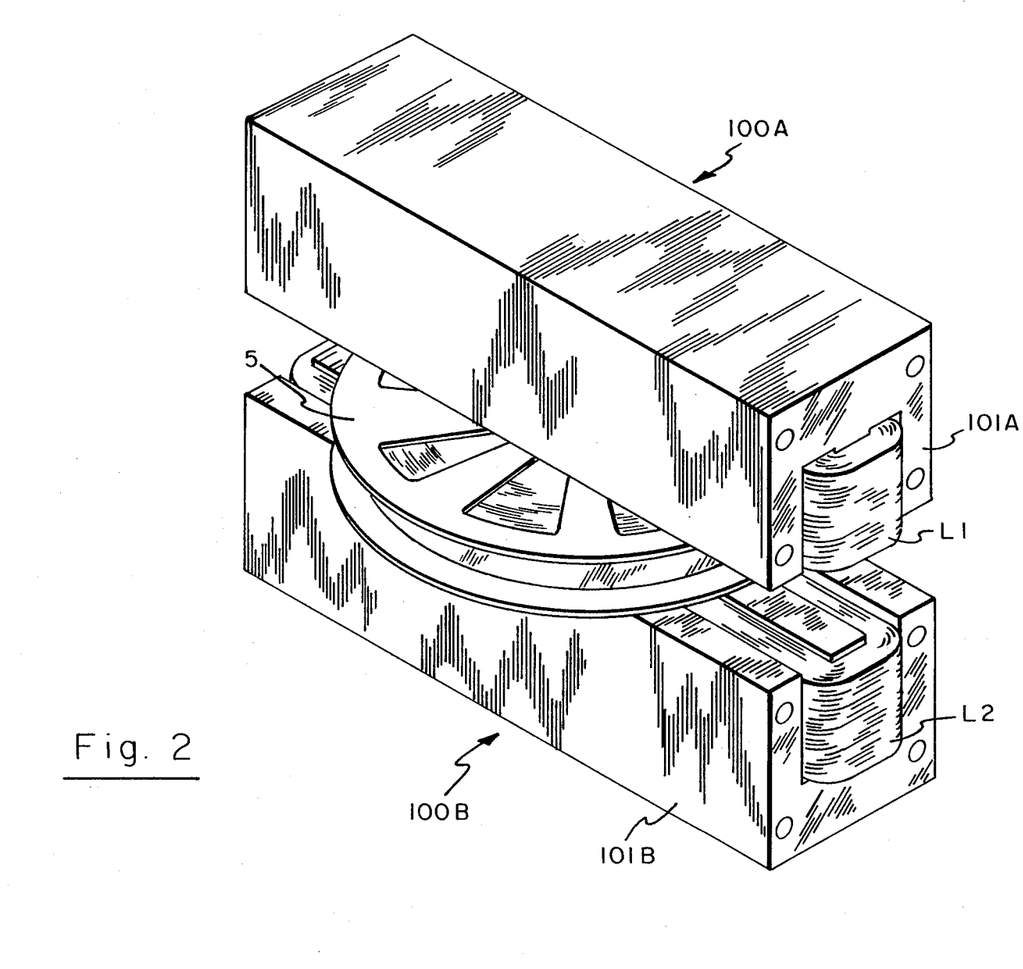
FIG. 2 is a perspective view of the opposing E-laminations and windings, used to generate the magnetic fields, and a reel of magnetic tape to be degaussed, shown in the region between the E-laminations.
Figure 3:
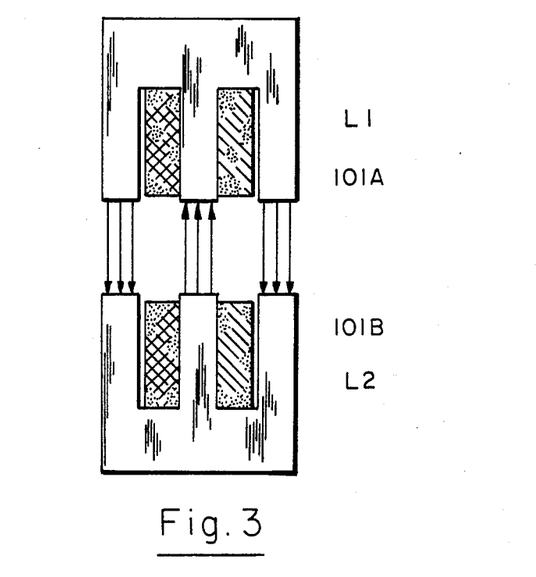
FIG. 3 is a cross-sectional view of the E-laminations and windings, illustrating the type of magnetic field lines obtained during one mode of operation.
Figure 4:
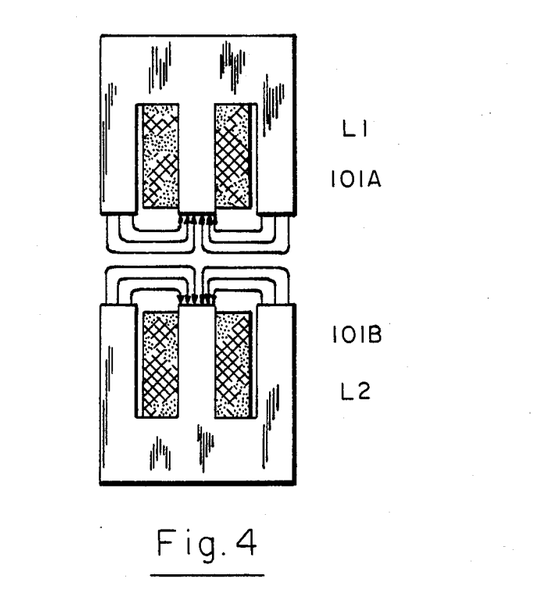
FIG. 4 is a cross-sectional view of the E-laminations and windings, illustrating the type of magnetic field lines obtained during another mode of operation.

In the present embodiment, each of the field generating means 100A and 100B comprises an E-lamination of magnetic material (101A and 101B, respectively) and a wire coil is wound on the central leg of each "E", as shown further in FIGS. 2-4.

Before describing operation of the energizing circuitry 300 and the routing for programming the processor 500, a general description of the operating procedure will be set forth. A reel 5 of magnetic tape to be degaussed is placed on the turntable 31 (FIG. 1) and the drawer 30 is closed. Rotation of the turntable is initiated, and the coils L1 and L2 of magnetic field generating means 100A and 100B are energized with an AC energizing potential to obtain a magnetic field with alternating polarity (at the AC frequency) in the region between the magnetic field generating means. During one mode of operation, the magnetic fields produced by the two coils are in the same direction. This is shown, for example, in FIG. 3, and results in magnetic field lines that are in a vertical orientation in the region that receives the reel of tape to be degaussed. Accordingly, during this mode of operation the magnetic field direction is along the width direction of the magnetic tape. As is described further hereinbelow, the magnetic field strength is gradually reduced, so as to prevent residual noise from being recorded on the tape. During a second mode of operation, the magnetic fields produced by the two coils are in opposite directions. This is shown, for example, in FIG. 4, where the field polarities of facing legs of the E-laminations oppose each other, and the magnetic field lines in the center have a substantially horizontal orientation; i.e. perpendicular to the field orientation that was obtained during the first mode. Due to the symmetry, the magnetic field lines are well defined in the horizontal direction. In the present embodiment, this field will be along the longitudinal direction of the magnetic tape. Again, the magnetic field is gradually reduced. The turntable rotation is then stopped, the drawer 30 is opened, and the degaussed magnetic tape can be removed.

It will be understood that either mode of operation can be selected for implementation first; i.e., it is a matter of choice as to the order in which the magnetic field orientations are applied. In the present embodiment, the field orientation is changed during the second mode by reversing the direction of current flow through one of the coils as compared to its direction of flow during the first mode.

Figure 5:
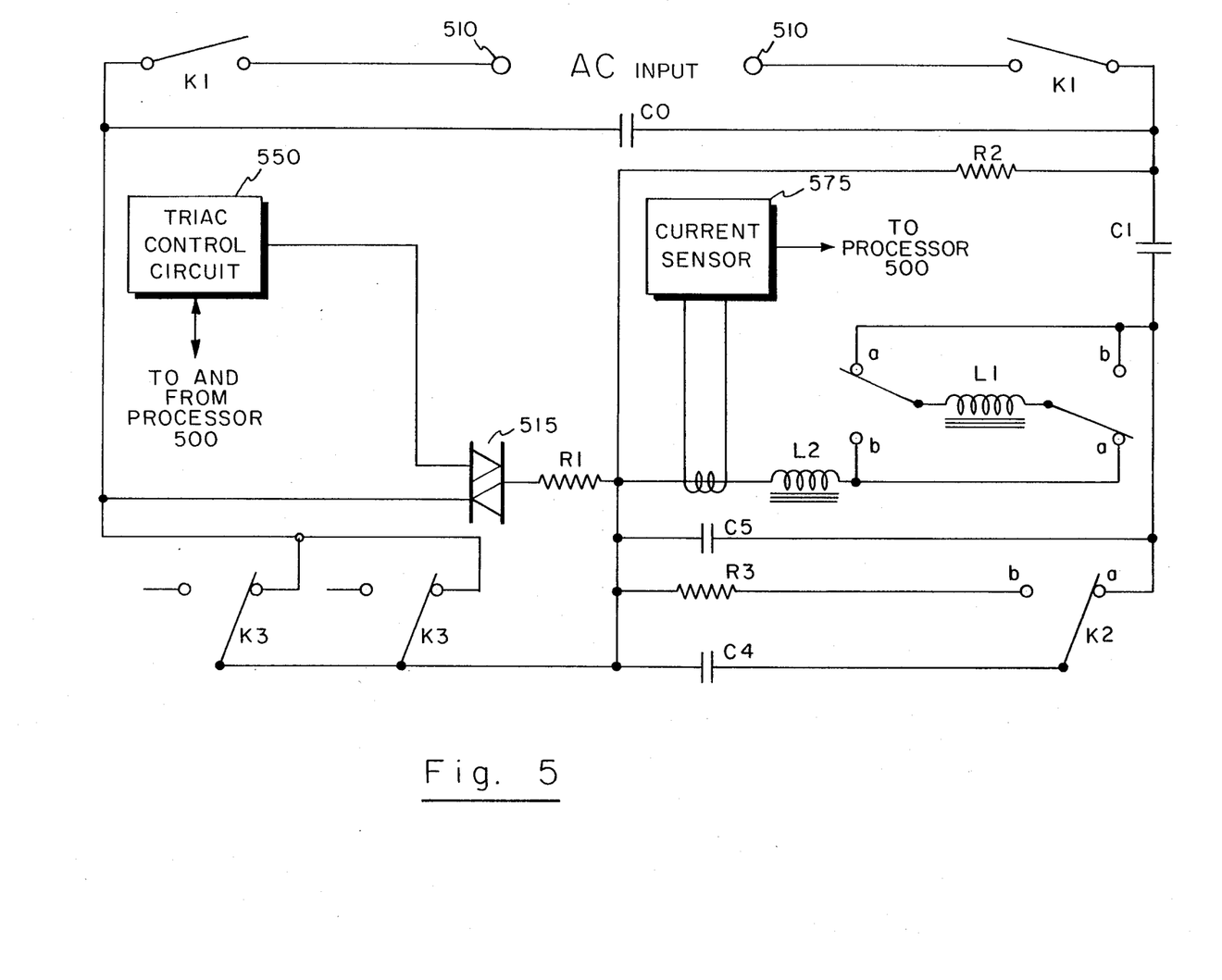
FIG. 5 is a schematic diagram, partially in block form, of the energizing circuitry.

Referring to FIG. 5, there is shown a schematic diagram, partially in block form, of the energizing circuitry 300 for energizing and controlling the magnetic field generating means 100A and 100B of the FIG. 1 embodiment. A source of AC potential, at a nominal voltage of 208 volts in the present embodiment, is applied to input terminals 510, across which are coupled, via a capacitor C1, the coils L1 and L2 in series arrangement with a triac 515 and a small surge-protection resistor R1. A relay K1 controls the application of the input potential, and a noise-suppression capacitor C0 is coupled across the input. The capacitors C4 and C5 are coupled across the coils L1 and L2, the capacitor C4 being coupled in the circuit through a stage of a relay K2. When the relay K2 is in its "b" position, the capacitor C4 is out of the main circuit and is coupled across a resistor R3, through which it discharges. A resistor R2, coupled across C1 and the coils, is provided for discharge of the capacitors in the event of interruption of the operating procedure.

The coils L1 and L2 are arranged such that the direction of connection of the coil L2 is not altered during the second mode of operation, but the direction of connection the coil L1 can be reversed by changing the status of the two indicated stages of relay K2. In the Figure, the stages of relay K2 are shown as being in the "a" position. It is seen that if the stages of relay K2 are in the "b" position, the current flow direction through L1 will be reversed.

A relay K3 is coupled in parallel across the series combination of the resistor R1 and the triac 515. The triac is controlled by control circuit 550, which is described further hereinbelow in conjunction with FIG. 6. The control circuit 550 communicates with the processor 500, and signals from the processor 500 are also utilized, as will be described, to control the relays of the FIG. 5 circuit. Further, the current through the coils L1 and L2 can be sensed by a current sensor 575, and the output thereof can be coupled to the processor 500 to monitor the current levels throughout the degaussing procedure.

In the circuit of FIG. 5, to reduce the current requirements from the power source and to improve the power factor of the degaussing system, a capacitor network (C2 and C5, with C4 in parallel with C5 during part of the cycle) is used to increase the circulating current and to provide a near unity power factor. In an embodiment hereof, for an applied voltage of 208 volts, a peak magnetic field strength of 5000 Oersteds was achieved. When the stages of relay K2 are in the "a" position, the coils produce magnetic fields that oppose (see the FIG. 4 illustration), there is less total effective inductance in the circuit, and capacitance C4 is in the circuit to obtain the desired resonance. However, when the stages of relay K2 are in the "b" position, the coils produce magnetic fields that are in the same direction (see the FIG. 3 illustration) and the capacitance C4 is removed from the circuit.

Figure 6:
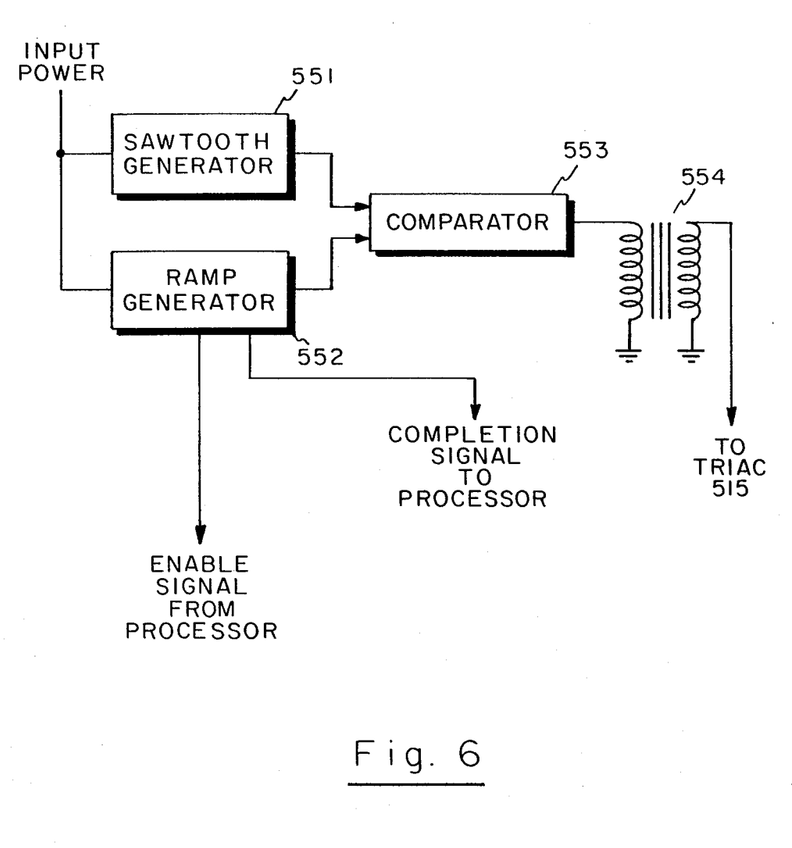
FIG. 6 is a block diagram of the triac control circuit of the FIG. 5 embodiment.
Figure 7A:
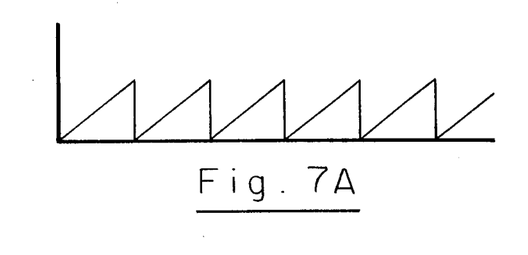
Figure 7B:
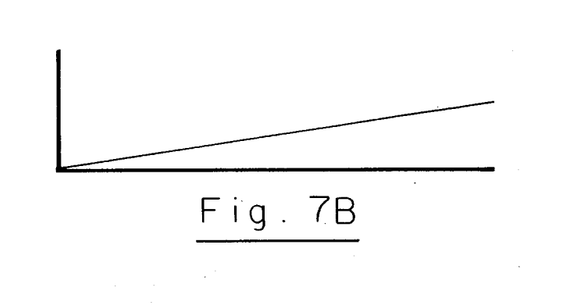
Figure 7C:
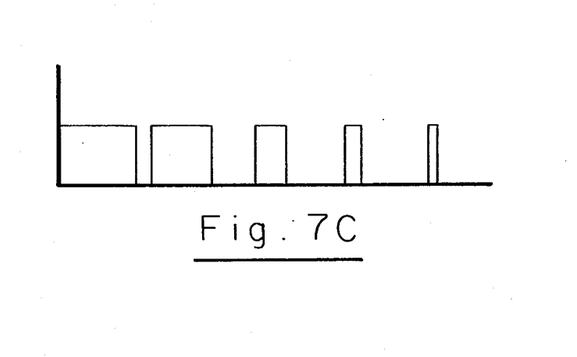

Referring to FIG. 6, there is shown a block diagram of the circuitry 550 for controlling the triac 515 of the FIG. 5 embodiment. The block 551, which receives a signal from a power supply (not shown), represents a sawtooth wave generation circuit that generates a sawtooth wave pattern, which is illustrated in the graph 7A of FIG. 7. Circuits for generating sawtooth-shaped signals, which typically include an integrator, are well known in the art. A ramp-generating circuit 552, also well known in the art, and including an integrator having a suitable selected time constant, is also provided, and produces a ramp signal, as shown in the graph 7B of FIG. 7. The ramp generator 552 is enabled by a signal from processor 500. The outputs of the circuits 551 and 552 are coupled to a comparator circuit 553, which operates to produce an output that is high when the input received from the sawtooth generator 551 is greater than the input received from the ramp generator 552, and low when the opposite is true. Accordingly, the signal output of comparator 553, as shown in the graph 7C of FIG. 7, is a square wave having a duty cycle that gradually decreases with time and eventually becomes zero when the amplitude of the ramp signal is greater than the peak of the sawtooth signal. When the ramp signal reaches this predetermined amplitude, a completion indication signal is sent to the processor 500. The output of the comparator 553 is coupled, via transformer 554, to the triac 515 of FIG. 5.

Figure 8A:
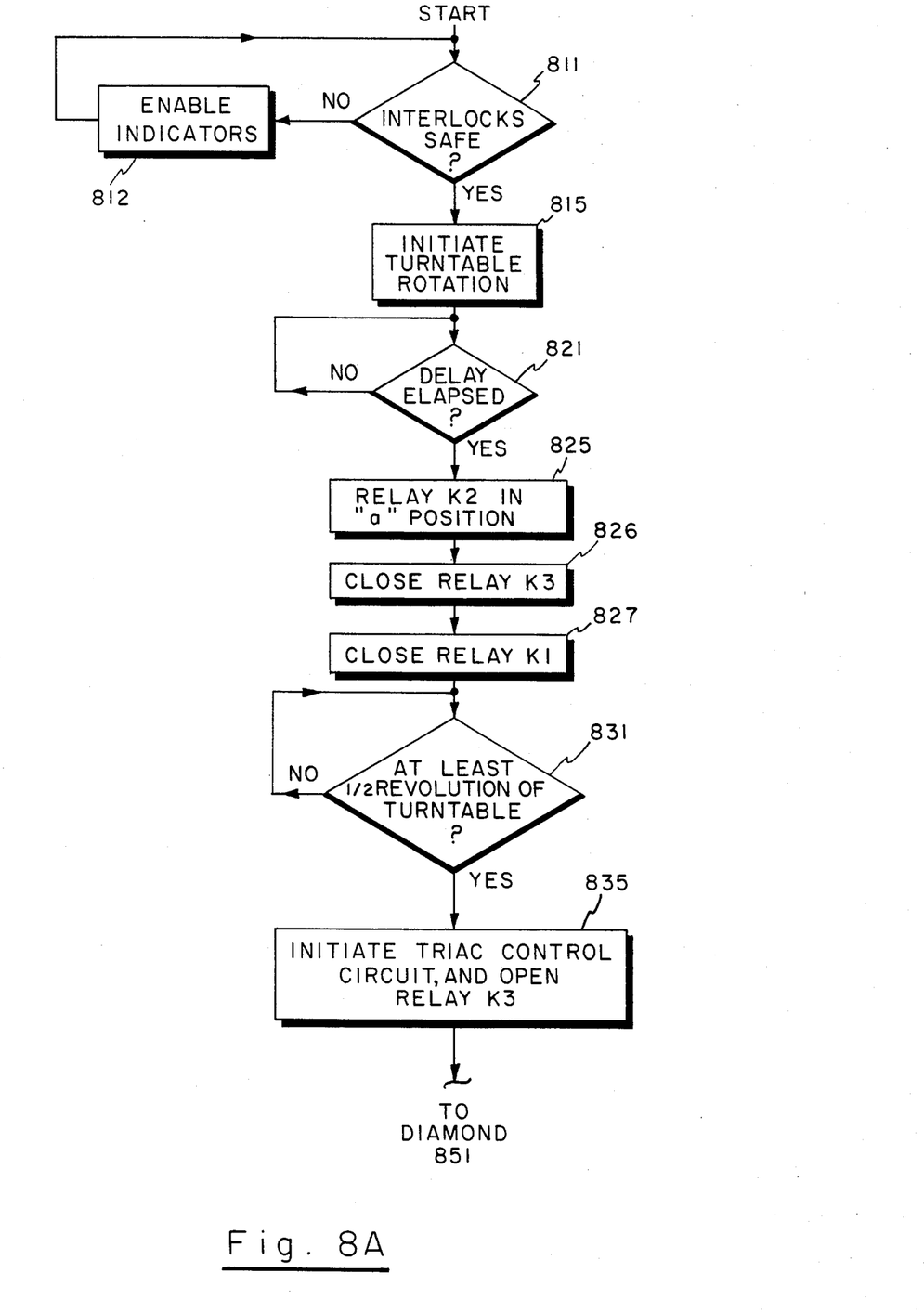
Figure 8B:
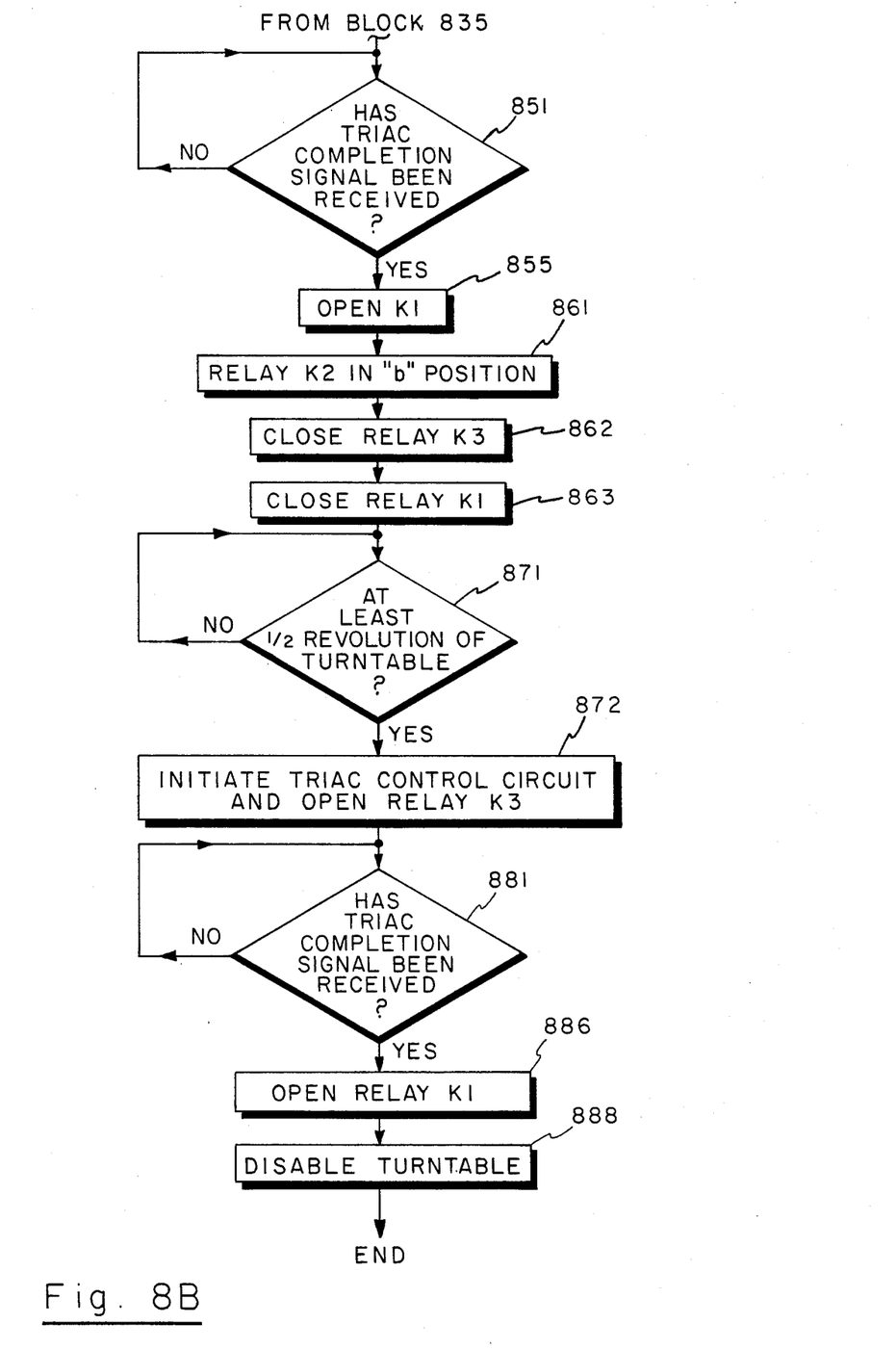

Referring now to FIG. 8, there is shown a flow diagram of the routine for programming the processor to control the circuitry of FIG. 5 in accordance with an embodiment of the invention, and to implement the described procedure. At the start of the routine, inquiry is made (diamond 811) to determine if interlocks are safe; that is, the drawer 30 is closed and any other suitable safety checks of the electrical circuitry indicate compliance. If not, suitable indicators are activated (block 812), and the routine cannot continue until safety compliance has been achieved. [It will be understood that further safety checks, throughout the routine, can be implemented, and the routine aborted if noncompliance is determined at any point.] When safety compliance is indicated, the block 815 is entered, this block representing the initiation of rotation of turntable 31, by coupling a suitable control signal to the turntable motor. A predetermined time, for example 5 seconds, is then allowed for turntable stabilization (as represented by diamond 821 and its associated loop). The blocks 825, 826, and 827 are then entered in succession, these blocks representing the generation of control signals to put relay K2 in the "a" position, close relay K3, and close relay K1. As seen in FIG. 5, the placement of the three stages of relay K2 in the "a" position results in a particular current flow direction through L1 (in relation to L2), as previously described, and also results in the capacitor C4 being coupled into the circuit in parallel with the series arrangement of coils and with C5. The closing of relay K3 results in the triac 515 and its series resistor R1 being bypassed, and the closing of relay K1 causes application of the AC energizing potential to the circuit. Diamond 831 is then entered, and represents, with its associated loop, a delay until at least one-half a revolution of the turntable has been implemented, while the circuit resonates and the alternating magnetic field, in its first orientation, is applied to the rotating reel of magnetic tape. In this manner, it is ensured that all of the tape has been exposed to the first field orientation.

The block 835 is then entered, this block representing the initiation of a cycle of the triac control circuitry 520 that was described above in conjunction with FIGS. 6 and 7, and also the opening of relay K3, so that the triac 515 and its associated resistor R1 are in the resonating circuit. As previously described, the triac control circuitry produces a control signal having a gradually reduced duty cycle, and this signal, in turn, controls the triac 515 to gradually reduce the current flow in the circuit, and thereby gradually reduce the applied magnetic field strength. This continues until the ramp voltage (FIG. 7B) reaches a predetermined level (at which time the duty cycle has become zero), whereupon a control signal is received by the processor 500. The diamond 851 and its associated loop represent the awaiting of this signal. The relay K1 is then opened (block 855), and the relay K2 is put in the "b" position, as represented by the block 861. This will result in the changing of the current flow direction through L1 which, in turn, results in the magnetic field orientation as illustrated in FIG. 3. In this situation, the capacitor C4 is removed from the circuit (position "b" of relay K2). Residual charge on the capacitor C4 is discharged through the resistor R3. The closing of relay K3 (block 862) again bypasses the triac 515 and its associated resistor R1, and the relay K1 is then closed (block 863) to initiate the second mode of the described degaussing process. The diamond 871 and its associated loop awaits one-half revolution of the turntable 31 (as described above in connection with diamond 831). The block 872 is then entered, this block representing the initiation of a new triac control cycle, and the opening of relay K3, so that the triac 515 is again operative to gradually reduce the magnetic field strength to zero. As previously described, the completion of the triac control cycle is then awaited (diamond 881 and its associated loop), whereupon relay K1 is opened (block 886) to remove power from the circuit, the turntable is disabled (block 888) and the degaussing is completed. The drawer 30 can then be opened for removal of the reel of magnetic tape.

The invention has been described with reference to a particular preferred embodiment, but variations within the spirit and scope of the invention will occur to those skilled in the art. For example, if desired, control of the cycles of operation can be operator-implemented instead of completely automatic.

I claim:

1. A method for degaussing a magnetic storage medium, comprising the steps of:
    disposing the magnetic storage medium in the region between a pair of substantially parallel windings;
    energizing the windings a first time to obtain either one state wherein the fields through the centers of the windings are in the same direction or another state wherein the fields through the centers of the windings are in opposing directions;
    energizing the windings a second time to obtain the state not used during said first energizing time; and
    rotating the magnetic storage medium during said first and second energizing of the windings.

2. The method as defined by claim 1, wherein each of said energizing steps includes gradually decreasing the strength of the fields produced by said windings.

3. The method as defined by claim 2, wherein each of said energizing steps includes applying AC energizing signals to said windings.

4. The method as defined by claim 1, wherein during the energizing of the windings a first time an AC energizing signal is applied across the windings in series, and during the energizing of the windings a second time said energizing signal is applied across the windings in series, but with the direction of connection of one of the windings being reversed.

5. The method as defined by claim 2, wherein during the energizing of the windings a first time an AC energizing signal is applied across the windings in series, and during the energizing of the windings a second time said energizing signal is applied across the windings in series, but with the direction of connection of one of the windings being reversed.

6. The method as defined by claim 4, further comprising capacitively resonating the current in the circuit containing said windings.

7. The method as defined by claim 6, further comprising the step of modifying the capacitance in the resonating circuit during the energizing of the windings a second time.

8. Apparatus for degaussing magnetic storage media, comprising:
    a pair of spaced apart magnetic field generating means;
    means for inserting a magnetic storage medium into the region between said field generating means;
    means for rotating the magnetic storage medium; and
    means for energizing both of said field generating means to produce a magnetic field substantially along one direction through the magnetic storage medium and for subsequently energizing both of said field generating means to electrically shift the direction of the produced magnetic field to be substantially along another direction through the magnetic storage medium, said another direction being perpendicular to said one direction; and.

9. Apparatus as defined by claim 8, wherein said spaced apart magnetic field generating means comprise spaced apart coils, wound on magnetic material, and wherein said energizing means includes means for energizing the windings a first time to obtain either one state wherein the fields through the centers of the windings are in the same direction or another state wherein the fields through the centers of the windings are in opposing directions, and means for energizing the windings a second time to obtain the state not used during the first energizing time.

10. Apparatus as defined by claim 8, wherein said energizing means further includes means for gradually reducing the strengths of the produced magnetic fields.

11. Apparatus as defined by claim 9, wherein said energizing means further includes means for gradually reducing the strengths of the produced magnetic fields.

12. Apparatus as defined by claim 8, wherein said spaced-apart magnetic field generating means comprise spaced-apart opposing E-laminations having respective windings thereon.

13. Apparatus for degaussing a reel of magnetic tape, comprising:
- a pair of opposing E-laminations, each having a coil wound on the center leg thereof;
- means for inserting the reel of magnetic tape into the region between said E-laminations;
- means for rotating the reel of magnetic tape;
- means for coupling an AC potential in series across said windings;
- means for reversing the direction of connection of one of said windings in the series arrangement;
- a capacitor coupled across said windings; and
- means for controlling said reversing means to be operative during a portion of an operating cycle of the degaussing apparatus.

14. Apparatus as defined by claim 13, further comprising a second capacitor, and means for switchably coupling said second capacitor across said windings.

15. Apparatus as defined by claim 13, wherein the length of said E-laminations are greater than the diameter of said reel of magnetic tape.

16. Apparatus as defined by claim 13, further comprising means for gradually reducing the current in said coils.

17. Apparatus as defined by claim 14, further comprising means for gradually reducing the current in said coils.

18. Apparatus as defined by claim 16, wherein said means for gradually reducing the current in said coils comprises a circuit for interrupting, repeatedly with an increasing duration of interruption, the current in said coils.

19. Apparatus as defined by claim 17, wherein said means for gradually reducing the current in said coils comprises a circuit for interrupting, repeatedly with an increasing duration of interruption, the current in said coils.

20. Apparatus as defined by claim 18, wherein said interrupting circuit comprises a triac switchably coupled in series with said coils, and means for controlling the triac.

* * * * *